F. WILLSON & H. F. SHINDEL.
SPECTACLE TEMPLE CONNECTION.
APPLICATION FILED DEC. 12, 1914.
1,147,773.    Patented July 27, 1915.
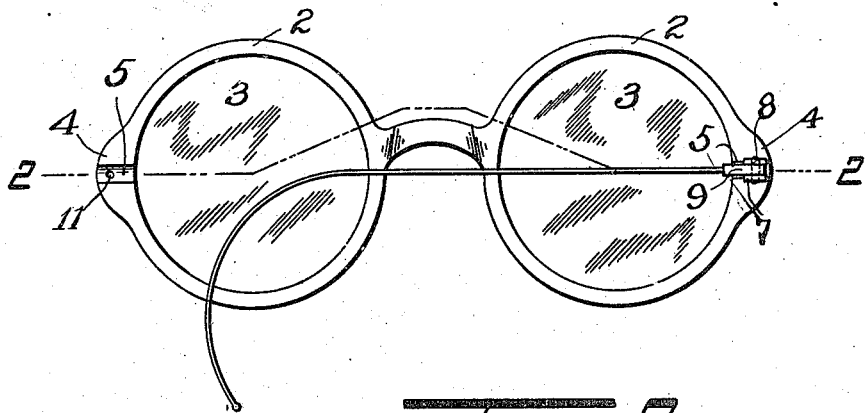
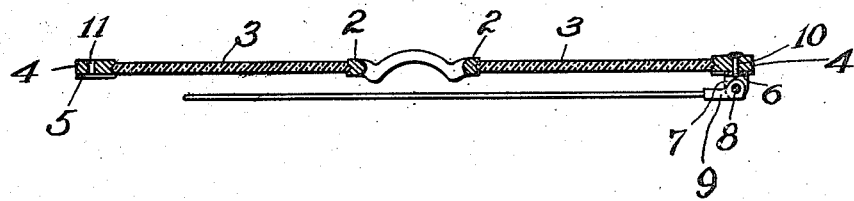
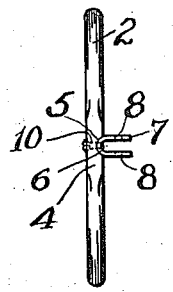
Frederick Willson
and Harry F. Shindel
Inventors

UNITED STATES PATENT OFFICE.

FREDERICK WILLSON, OF READING, AND HARRY F. SHINDEL, OF GLENSIDE, PENNSYLVANIA, ASSIGNORS TO T. A. WILLSON & CO., INC., OF READING, PENNSYLVANIA, A CORPORATION OF PENNSYLVANIA.

SPECTACLE-TEMPLE CONNECTION.

1,147,773.   Specification of Letters Patent.   Patented July 27, 1915.

Application filed December 12, 1914.   Serial No. 876,788.

*To all whom it may concern:*

Be it known that we, FREDERICK WILLSON and HARRY F. SHINDEL, both citizens of the United States, respectively residing at Reading and Glenside, both in the county of Berks and State of Pennsylvania, have invented certain new and useful Improvements in Spectacle-Temple Connections, of which the following is a specification.

Our invention relates to spectacle temple connections, and more particularly to so called shell-frame spectacles, or the like, which are adapted to permit of specially forming the temple-connecting frame portions thereof for attachment of the connection hereinafter fully described in connection with the accompanying drawings; the novel features of the structure being specifically pointed out in the claims.

Figure 1 is a rear face view of a spectacle frame, showing a temple-connection attachment to only one lens-engaging portion thereof, the other being removed to show the seating recess therefor. Fig. 2 is an edge view in section on the line 2—2 of Fig. 1; and Fig. 3 is an end edge view.

The drawing shows an integrally formed spectacle frame, comprising similar unbroken eye-band portions 2, 2, in which the respective lenses 3, 3 may be separately secured by contraction of the heat-expanded frame, as usual in this type of spectacles. Each eye-band 2 thus forms a solid lens-inclosing ring to which the temples must be connected; and our invention consists in the simple means for economically and satisfactorily accomplishing this hereinafter particularly described, with reference to the accompanying drawing.

The side portion of each eye-band 2 is widened in the plane of the lens to form a temple-connecting portion 4. This portion we provide, as shown, with a transversely-extending groove 5 in one face thereof, as indicated to the left of Fig. 1, which groove is conformed in cross-section to the base portion 6 of the separate temple connection 7, so as to form a recessed seating for the latter. The temple connection 7, as shown, is formed from a sheet-metal blank, which is bent to U-shape, and provided with pivot-pin apertures 8 in its parallel ear portions for connection thereto of the pivot end of a temple 9.

When this simply formed temple-connection is seated in the groove or recess 5 of the frame, it will be readily seen that it is firmly held against turning movement in the plane of the frame, though it may be set laterally to proper clamping position as indicated. The clamping may be rigidly effected by means of a single rivet or screw clamping-pin 10 which is passed through an aperture 11 therefor in the frame and engages an aperture 12 in the base of the properly set temple connection 3; the latter being thereby firmly drawn to its grooved seating in the frame and also positively prevented from rocking in a plane at right angles to the plane of the frame. Thus absolute rigidity of the connection to the frame is provided for in connection with great simplicity, convenience and economy in construction.

What we claim is:

1. In spectacles, the combination of a lens engaging frame, having a temple-connecting portion of increased width in the plane of the lens provided with a temple-connecting recess in one face thereof, a temple-connection non-rotatably engaged in said recess, and means for clamping said temple-connection to the frame.

2. In spectacles, the combination of a lens engaging frame, having a temple-connecting portion of increased width in the plane of the lens provided with a temple-connecting transverse groove in one face thereof, a U-shaped temple-connection non-rotatably seated in said groove, and means for clamping said temple-connection to the frame.

3. In spectacles, the combination of a lens engaging frame, having a temple-connecting portion of increased width in the plane of the lens provided with a temple-connecting transverse groove in one face thereof, a temple connection formed of sheet metal bent to U-shape and non-rotatably seated in said groove, and a clamping pin engaged in apertures formed in said frame and temple-connection.

In testimony whereof we affix our signatures in presence of two witnesses.

FREDERICK WILLSON.
HARRY F. SHINDEL.

Witnesses:
ADAM L. OTTERBEIN,
D. M. STEWART.